United States Patent
Berkey

(10) Patent No.: US 11,713,130 B2
(45) Date of Patent: Aug. 1, 2023

(54) METHOD FOR USING CONTOUR CORRECT THERMOPLASTIC CORE IN BONDED ACOUSTIC PANEL ASSEMBLY

(71) Applicant: The Boeing Company, Chicago, IL (US)

(72) Inventor: Tyler Emerson Berkey, Ladson, SC (US)

(73) Assignee: THE BOEING COMPANY, Chicago, IL (US)

( * ) Notice: Subject to any disclaimer, the term of this patent is extended or adjusted under 35 U.S.C. 154(b) by 374 days.

(21) Appl. No.: 16/875,813

(22) Filed: May 15, 2020

(65) Prior Publication Data
US 2021/0354844 A1 Nov. 18, 2021

(51) Int. Cl.
| | | |
|---|---|---|
| B64D 33/02 | (2006.01) |
| F02C 7/045 | (2006.01) |
| B32B 3/12 | (2006.01) |
| B33Y 80/00 | (2015.01) |
| B33Y 10/00 | (2015.01) |
| G10K 11/172 | (2006.01) |
| G10K 11/168 | (2006.01) |

(52) U.S. Cl.
CPC .............. *B64D 33/02* (2013.01); *B32B 3/12* (2013.01); *F02C 7/045* (2013.01); *B32B 2307/102* (2013.01); *B32B 2605/18* (2013.01); *B33Y 10/00* (2014.12); *B33Y 80/00* (2014.12); *B64D 2033/0206* (2013.01); *F05D 2240/14* (2013.01); *F05D 2260/963* (2013.01); *G10K 11/168* (2013.01); *G10K 11/172* (2013.01)

(58) Field of Classification Search
CPC .............. G10K 11/172; G10K 11/168; F05D 2260/963; F05D 2240/14; B64D 2605/18; B64D 33/02; B32B 2307/102; B32B 3/12; B33Y 80/00; B33Y 10/00; F02C 7/045
See application file for complete search history.

(56) References Cited

U.S. PATENT DOCUMENTS

| | | | | |
|---|---|---|---|---|
| 4,084,367 A * | 4/1978 | Saylor | ............... | B29D 24/005 |
| | | | | 428/116 |
| 7,337,875 B2 * | 3/2008 | Proscia | ............... | F02C 7/24 |
| | | | | 181/290 |
| 8,381,872 B2 * | 2/2013 | Alexander | ............... | G10K 11/162 |
| | | | | 52/145 |
| 8,689,936 B2 * | 4/2014 | Richter | ............... | G10K 11/172 |
| | | | | 52/145 |
| 9,797,801 B2 | 10/2017 | Batcheller et al. | | |
| 10,453,438 B1 | 10/2019 | Griffin et al. | | |

(Continued)

OTHER PUBLICATIONS

Acoustic instabilities control using Helmholtz resonators, Rogerio Cora, Cristiane Aparecida Martins, Pedro Teixeira Lacava, Applied Acoustics 77 (2014) 1-10, 2013.

*Primary Examiner* — Forrest M Phillips
(74) *Attorney, Agent, or Firm* — Gates & Cooper LLP

(57) ABSTRACT

An acoustic panel including a first face sheet having a plurality of openings; a core attached to the face sheet, the core comprising a plurality of cells each having cell walls; and a plurality of noise attenuating features each comprising at least one of the openings in combination with one of the cells, wherein the openings are disposed away from the cell walls so that the noise attenuating features suppress the transmission of acoustic waves in acoustic communication with the openings.

20 Claims, 15 Drawing Sheets

(56) References Cited

U.S. PATENT DOCUMENTS

| | | | |
|---|---|---|---|
| 10,783,869 B2* | 9/2020 | Alstad | B33Y 80/00 |
| 2002/0036115 A1* | 3/2002 | Wilson | F02C 7/045 |
| | | | 181/290 |
| 2009/0301055 A1 | 12/2009 | Kallappa | |
| 2017/0089238 A1* | 3/2017 | Leyko | B33Y 80/00 |
| 2017/0260871 A1 | 9/2017 | Schmidt et al. | |
| 2019/0063318 A1 | 2/2019 | Roach et al. | |
| 2020/0051543 A1 | 2/2020 | Griffin et al. | |
| 2020/0333001 A1 | 10/2020 | Dyszkiewicz et al. | |
| 2020/0408106 A1 | 12/2020 | Kamofski et al. | |
| 2021/0158792 A1* | 5/2021 | Holland | B24C 1/04 |
| 2022/0145082 A1 | 5/2022 | Brendel et al. | |
| 2022/0194607 A1 | 6/2022 | Ward | |

* cited by examiner

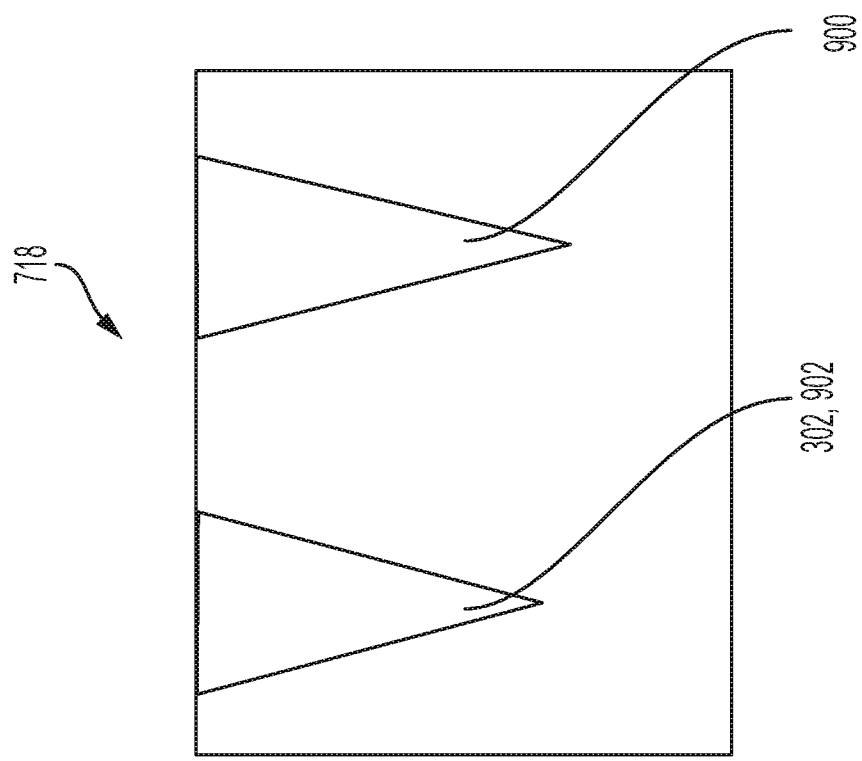

METHOD FOR USING CONTOUR CORRECT THERMOPLASTIC CORE IN BONDED ACOUSTIC PANEL ASSEMBLY

CROSS REFERENCE TO RELATED APPLICATIONS

This application is related to co-pending and commonly assigned U.S. patent application Ser. No. 16/875,820, filed on same date herewith, by Tyler Berkey and entitled "METHOD OF USING ADDITIVELY MANUFACTURED ACOUSTIC PANELS USING FINE TUNED HELMHOLTZ RESONATORS FOR NOISE REDUCTION," which application is incorporated by reference herein.

BACKGROUND

1. Field

The present disclosure relates to acoustic panels and methods of making the same.

2. Description of the Related Art

Acoustic foam, honeycomb acoustic paneling, and/or metal acoustic paneling are used to suppress noise from turbomachinery such as aircraft engines. In some implementations, the acoustic paneling includes a core comprising Helmholtz resonators coupled to perforations in a front sheet on the acoustic paneling. A volume of air near the perforations vibrates or oscillates in response to acoustic waves propagating through the volume of air, causing damping or suppression of the acoustic waves. However, such conventional acoustic paneling requires multiple complex manufacturing steps. Accordingly, there is a need for continued research and development efforts in the field of manufacturing of the acoustic paneling. The present disclosure satisfies this need.

SUMMARY

Acoustic panels, aircraft including the same, and associated methods are disclosed herein. Illustrative, non-exclusive examples of inventive subject matter according to the present disclosure are described in the following enumerated paragraphs:

A1. An acoustic panel, comprising:
a first face sheet having a plurality of openings;
a core attached to the first face sheet, the core comprising a plurality of cells each having cell walls; and
a plurality of noise attenuating features each comprising at least one of the openings acoustically coupled to one of the cells, wherein the openings are disposed away from the cell walls so that the noise attenuating features suppress a transmission of acoustic waves in acoustic communication with the perforations.

A2. The acoustic panel of paragraph A2, wherein at least 95%, at least 99%, or 100% of the openings are disposed away from the cell walls and do not overlap with or puncture the cell walls.

A3. The acoustic panel of any of the paragraphs A1-A2, wherein the noise attenuating features comprise Helmholtz resonators.

A4. The acoustic panel of any of the paragraphs A1-A3, wherein the core comprises a first region having a higher density of the cells and a second region having a lower density of the cells, without a joint between the first region and the second region.

A5. The acoustic panel of paragraph A4, wherein the core comprises a single monolithic piece including the higher density regions in more accurate correspondence with major load paths as compared to a core assembled from higher density regions spliced together with lower density regions.

A6. The acoustic panel of any of the paragraphs A4-A5, further comprising an interfacial region between the first region and the second region, wherein the higher density of cells varies in the first region, the lower density of cells varies in the second region, and density of cells in the interfacial region varies from the lower density adjacent the first region and the higher density adjacent the second region.

A7. The acoustic panel of any of the paragraphs A1-A6, further comprising a second face sheet or backing structure attached to the core so that the core is sandwiched between the first face sheet and the second face sheet or the backing structure.

A8. The acoustic panel of paragraph A7, wherein the core is additively manufactured or molded with a back contour that is tailored to contour and fit the second face sheet or the backing structure.

A9. The acoustic panel of any of the paragraphs A1-A8, wherein the core is additively manufactured, 3D printed, or molded.

A10. The acoustic panel of paragraph A9, wherein the core includes a fastener for attaching the acoustic panel in an assembly and the core has a lower mass than an identical core that is not additively manufactured or molded.

A11. The acoustic panel of paragraph A10, wherein the core comprises a thermoplastic.

A12. The acoustic panel of any of the paragraphs A1-A11, wherein the cell walls consist essentially of molded thermoplastic.

A13. An apparatus, comprising:
a nacelle including the acoustic panel of any of the paragraphs A1-A12; and
an aircraft engine housed in the nacelle, wherein the acoustic panel suppresses the transmission of the acoustic waves generated in the aircraft engine.

A14. An apparatus, comprising a thrust reverser assembly comprising the acoustic panel of any of the paragraphs A1-A13.

A15. An aircraft component comprising the acoustic panel of any of the paragraphs A1-A14.

B1. A method of making an acoustic panel, comprising:
attaching a first face sheet to a core including a plurality of cells having cell walls; and
perforating or forming the face sheet with a plurality of openings (e.g., comprising perforations) after attaching the face sheet to the core, so as to form a plurality of noise attenuating features (e.g., Helmholtz resonators) each comprising at least one of the openings in combination with one of the cells, wherein the openings are disposed away from the cell walls so that the noise attenuating features suppress the transmission of acoustic waves in acoustic communication with the openings.

B2. The method of paragraph B1, further comprising attaching a second face sheet or backing structure to the core so that the core is sandwiched between the first face sheet and the second face sheet or the backing structure.

B3. The method of paragraph B1 or B2, further comprising curing the core, the first face sheet, and the second face sheet prior to perforating the first face sheet.

B4. The method of paragraphs B1 or B2, further comprising fabricating the acoustic panel with a single cure step prior to perforating the first face sheet.

B5. The method of any of the paragraphs B1-B3, further comprising additively manufacturing the core.

BRIEF DESCRIPTION OF THE DRAWINGS

Referring now to the drawings in which like reference numbers represent corresponding parts throughout:

FIG. 9 illustrates a thrust reverser assembly comprising a wedge including an acoustic treatment fabricated according to the method of FIG. 2.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

Figure 1:
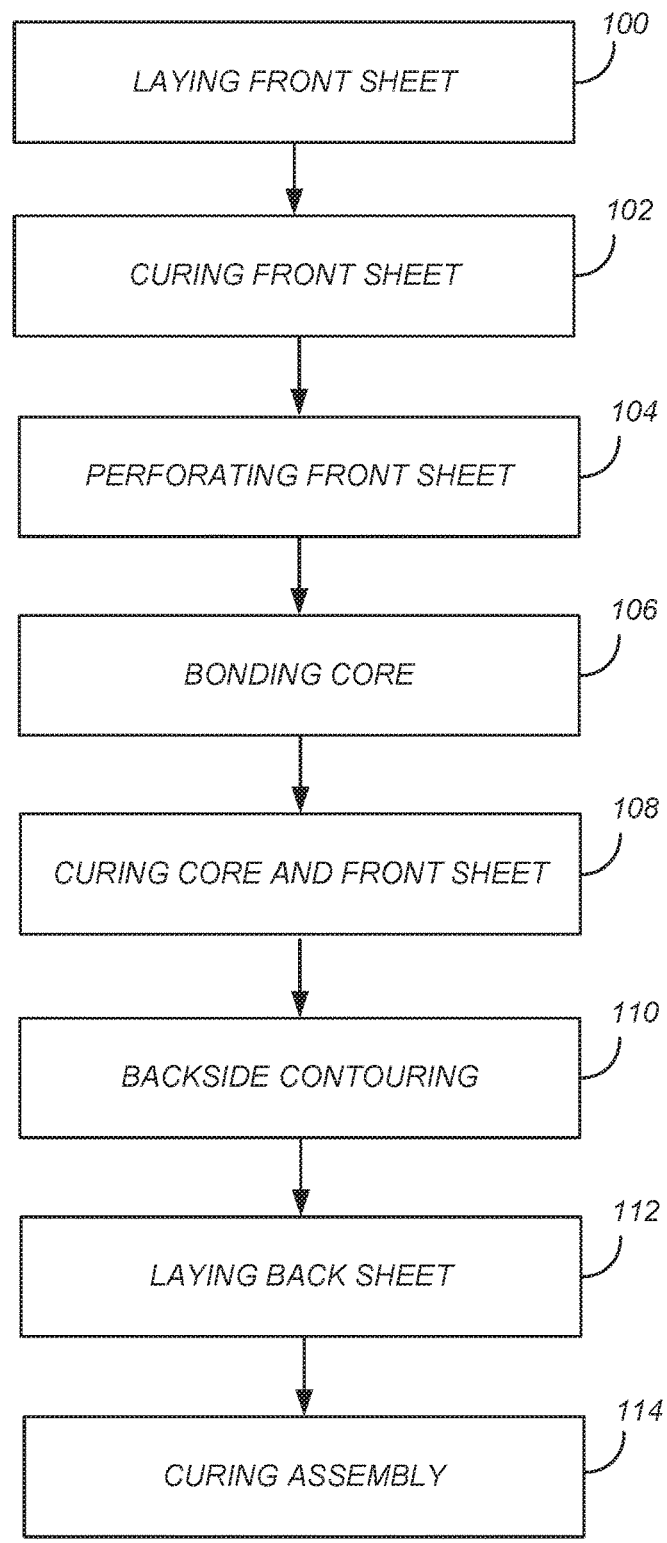
FIG. 1 is a flowchart illustrating a conventional method of making an acoustic panel, including multiple autoclave cure cycles and manufacturing steps.

A conventional acoustic panel comprises a core including a plurality of Helmholtz resonators each comprising a cell coupled to a perforation in a front sheet, wherein the cell has cell walls. FIG. 1 is a flowchart illustrating a conventional method of making the acoustic panel using multiple autoclave cure cycles and manufacturing steps. The method comprises laying up the front sheet (Block 100); a first curing step curing the front sheet in an autoclave (Block 102); perforating the front sheet (Block 104); bonding or adhering a core (comprising spliced together core pieces) to the front sheet (Block 106); a second curing step curing the core and front sheet together (Block 108); a computer numerical control (CNC) machining step machining a backside contour into the core (Block 110); laying a back sheet onto the backside contour (Block 112); and a third curing step curing the assembled acoustic panel comprising the front sheet, the core, and a back sheet (Block 114).

In such a conventional process, the location of the cell walls under the front sheet is unknown so that, if the perforating were performed after bonding the core to the front sheet, the perforating would cause puncturing of a large number of the cell walls and undesirably large stress knockdown in the acoustic paneling. As a result, in the process according to FIG. 1, the perforating is performed prior to bonding the front sheet to the core to avoid the perforating damaging the cell walls; consequently, the method requires an additional curing step. Overall, the method of FIG. 1 is an inefficient and time-consuming process involving three autoclave cures, a perforating operation, a CNC machining step, and a splicing step for splicing the core pieces together, resulting in high capital upfront costs to manufacture.

Example Manufacturing Process with Reduced Curing Cycles

Figure 2:
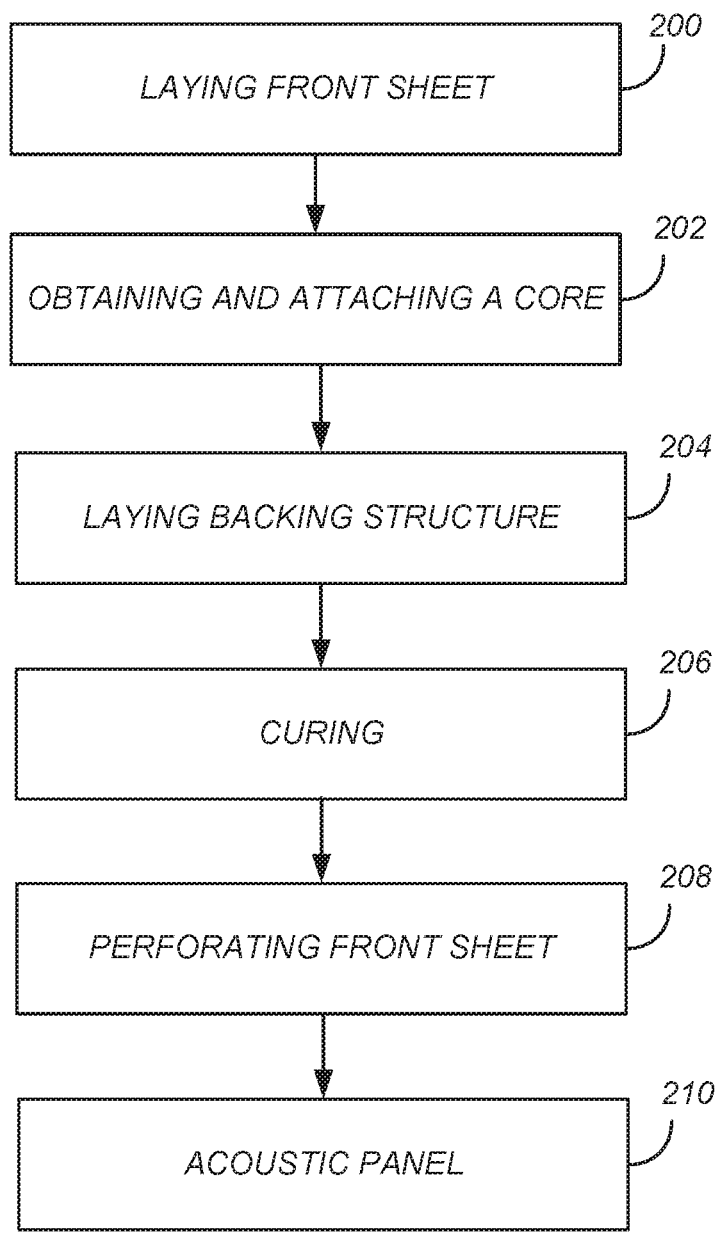
FIG. 2 is a flowchart illustrating a method of making an acoustic panel according to one or more examples described herein.

FIG. 2 illustrates a novel method of making an acoustic panel including a core comprising noise attenuating features each comprising cells having cell walls. The method comprises the following steps.

Block 200 represents laying up a first face sheet (a front sheet), e.g., on a tool.

Figure 4B:
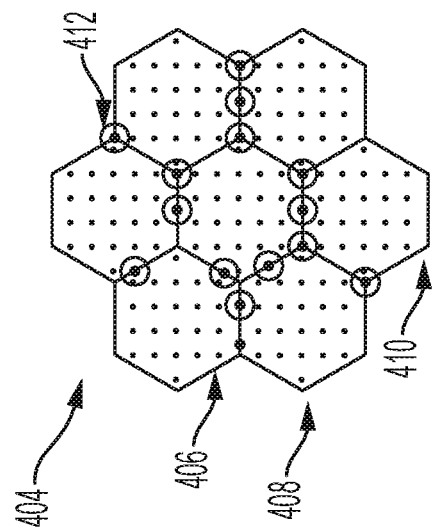
FIG. 4B is a full sectional view of an area of the acoustic panel fabricated using the method of FIG. 1, showing the interior as viewed from the top and the positioning of the perforations overlapping with the cells.

Block 202 represents obtaining or manufacturing a core and attaching (e.g., bonding or adhering) the core to the front sheet, e.g., on the tool. In one or more examples, the core comprises a thermoplastic or composite core instead of a core comprising a low density core spliced together with a high density core. In one or more examples, the core is additively manufactured or molded depending on the strength and environment of the acoustic panel being manufactured. Molding or additively manufacturing the core allows the core to be custom designed to more accurately implement higher density core and low density core according to need, with transition regions between the low density regions and high density regions (as illustrated in FIG. 4C discussed further below) instead of a splice joins between core pieces (as illustrated in FIG. 4D). Moreover, molding or additively manufacturing allows the core to be tailored in more exact correspondence with stress needs, utilizing denser core along major load paths and less dense core in the field areas between the major load paths. Molding or additive manufacturing of the core also enables the core to be manufactured as a single piece with the final backside contour(s) already built into the single piece, thereby avoiding additional contour machining steps.

In one or more examples, the manufacturing comprises obtaining a data file including the dimensions and design of the core and the structural features of the core, and printing or molding the acoustic panel using a three dimensional (3D) printer, additive manufacturing machine, or molding machine controlled by a computer so that the computer instructs the additive manufacturing machine, the 3D printer, or the molding machine to print or mold the core, including the cavities and openings associated with the noise attenuating features, according to the design and dimensions obtained from the data file.

Block 204 represents optionally laying a second face sheet (e.g., back sheet) or backing structure on the core so that the core is sandwiched between the back sheet and the front sheet.

Block 206 represents curing the acoustic panel comprising the front sheet, the core, and the back sheet, in an autoclave. In one or more examples, the acoustic panel is cured in a single curing step, thereby reducing the number of autoclave curing steps or cycles by 2 as compared to the method of FIG. 1.

Block 208 represents perforating the front sheet with openings. In one or more examples, the perforating is performed without stress knockdown because the exact location of the cell walls is known from the design of the core (or the data file storing the design and used to control the manufacturing of the core). Specifically, in one or more examples, the perforating operation is programmed by the computer to avoid the cell walls, thereby removing the stress knockdown that would otherwise result from blindly perforating after installing the core.

Figure 3A:
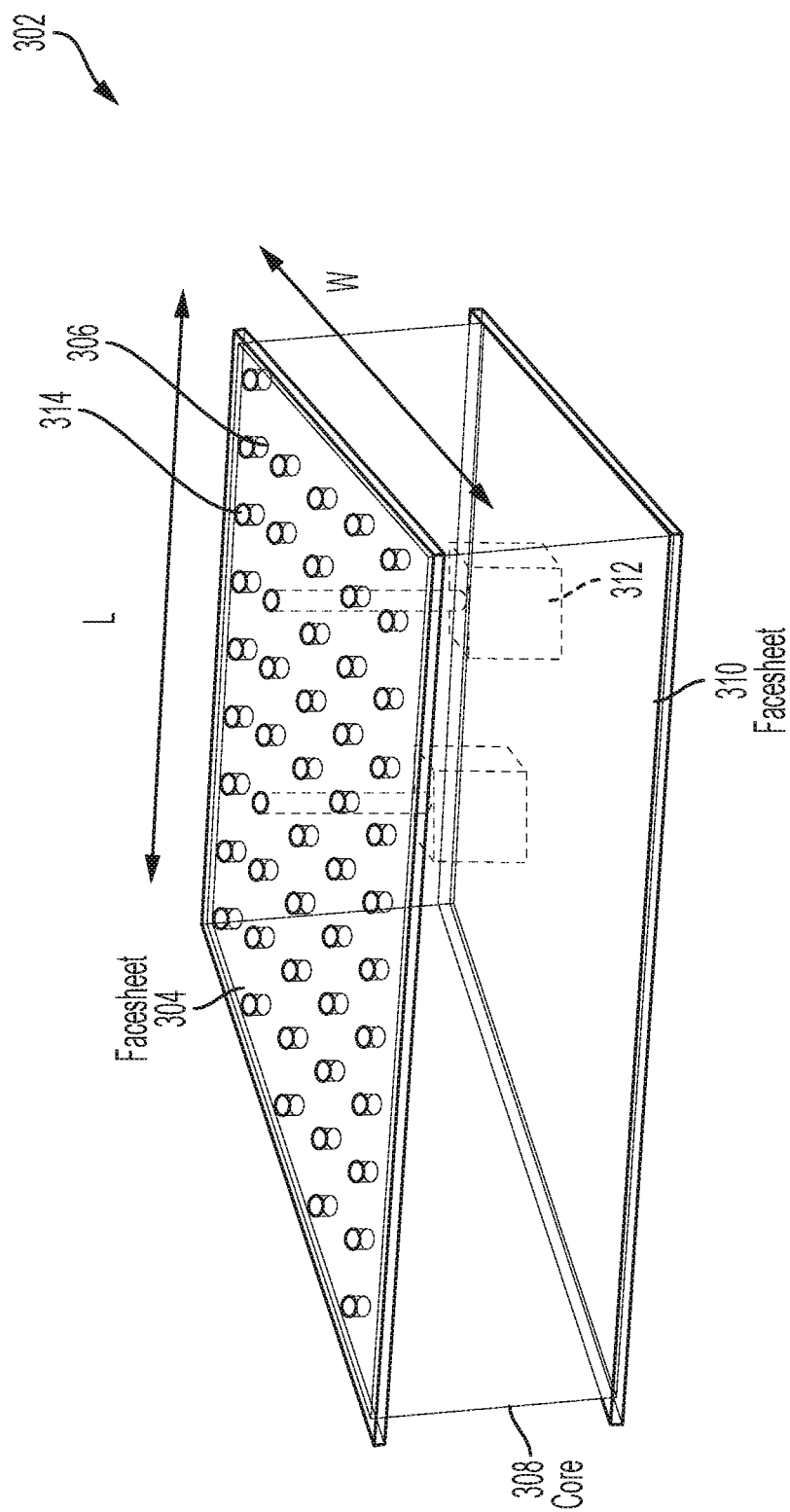
FIG. 3A is a perspective view of an acoustic panel fabricated according to the method of FIG. 2.
Figure 3B:
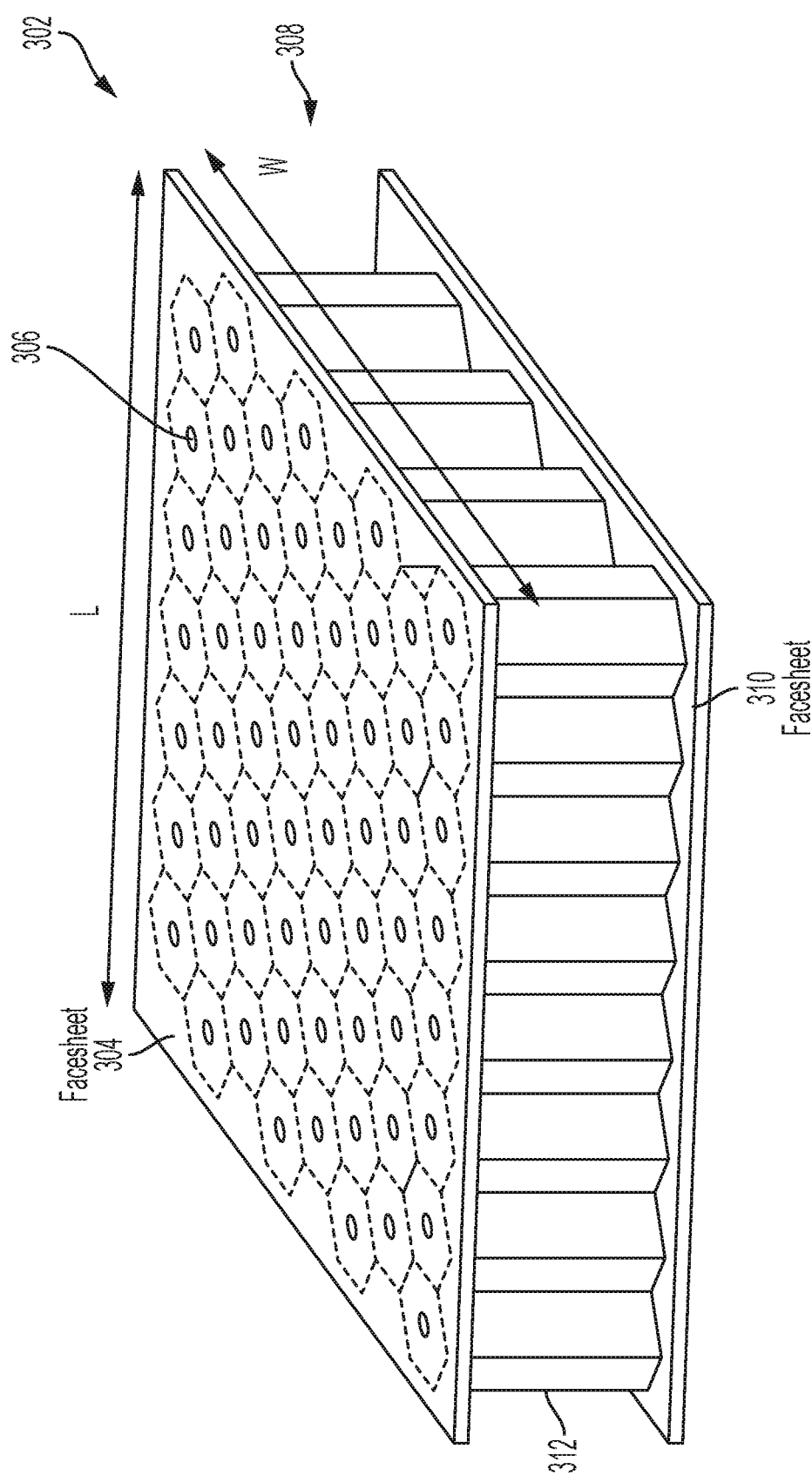
FIG. 3B is a perspective view of an acoustic panel fabricated according to the method of FIG. 2 and including hexagonal shaped cells.
Figure 3C:
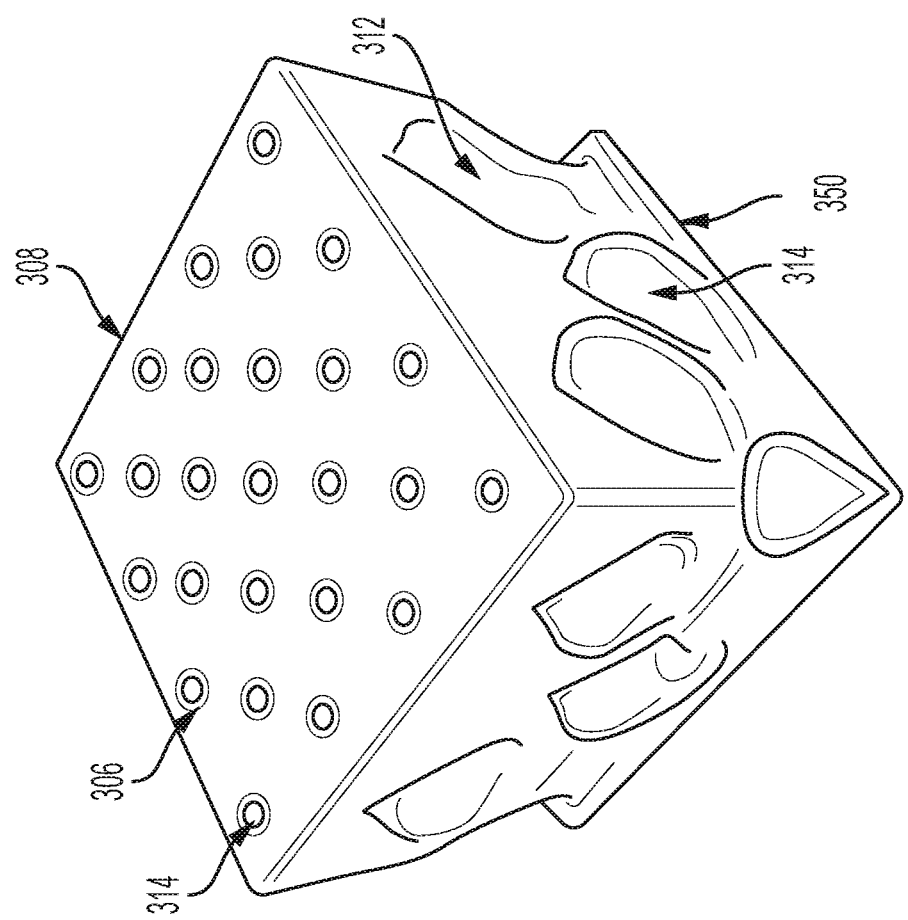
FIG. 3C is a perspective view of an additively manufactured core for the acoustic panel according to the method of FIG. 2.

Block 210 represents the end result, an acoustic panel. FIGS. 3A and 3B illustrate example acoustic panels 302, comprising a first face sheet 304 (front sheet) having a plurality of perforations 306; a core 308 attached to the first face sheet 304; and a second face sheet 310 (back sheet) or backing structure attached to a backside of the core. FIG. 3C illustrates the core 308 comprises a plurality of cells 312, a plurality of openings 314, and wherein each of the openings 314 are in communication with one of the cells and coincide with one of the perforations 306 in the first face sheet. Each of the noise attenuating features 316 comprise one of the cells 312, one of the openings 314, and one of the perforations 306. Example dimensions for the acoustic panel include, but are not limited to, a width W in a range of 5 inches-5 feet and a length L in a range of 5 inches-5 feet.

Example materials for the front sheet and the back sheet include, but are not limited to, composite materials comprising fiber tows and/or filaments combined with resin. Example materials for the fiber tows and filaments include, but are not limited to, materials comprising or consisting essentially of, glass, fused silica, fiberglass, metal, carbon fiber, carbon, boron, metal, mineral and polymer, etc. Examples of the polymers include, but are not limited to, thermoplastics, such as polyamide, polyetherketone (PEK), polyether ether ketone (PEEK), polyetherketoneketone (PEKK), Polyetherimide (PEI), or hybrid forms of thermoplastics, with modifiers and/or inclusions such as carbon nanotube(s), graphene, clay modifier(s), discontinuous fiber(s), surfactant(s), stabilizer(s), powder(s) and particulate(s).

In one or more examples, the material printed, deposited or molded to form the core comprises or consists essentially of a thermoplastic or a hybrid of the thermoplastic, e.g., as described above.

Figure 4A:
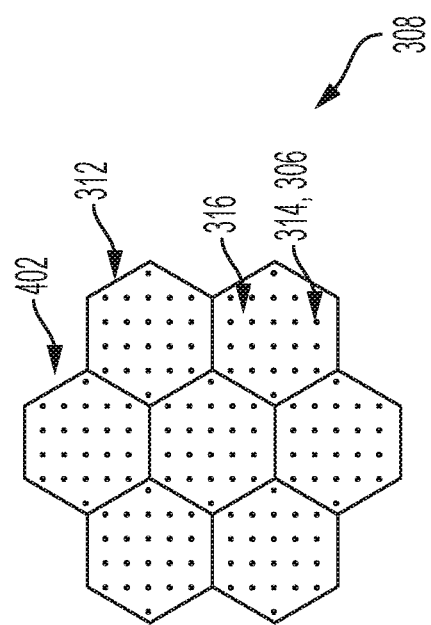
FIG. 4A is a full sectional view of an area of the acoustic panel fabricated using the method of FIG. 2, showing the interior as viewed from the top and the positioning of the perforations relative to the cells of the noise attenuating features.
Figure 4D:
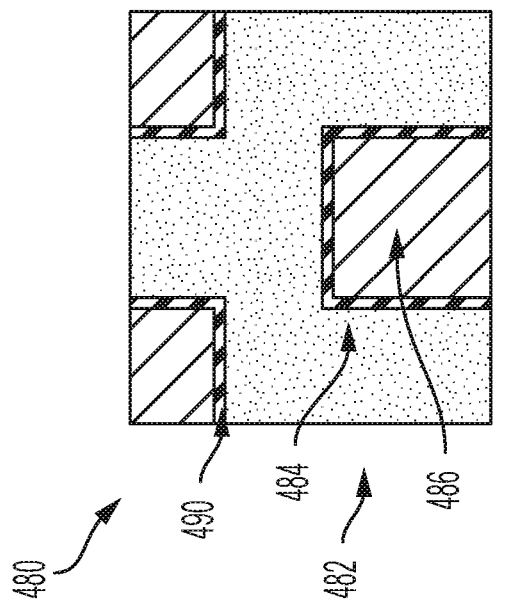
FIG. 4D illustrates a generic, non-customized acoustic panel having an acoustic property that is not tailored to suppress noise and manufactured using the method of FIG. 1.
Figure 4C:
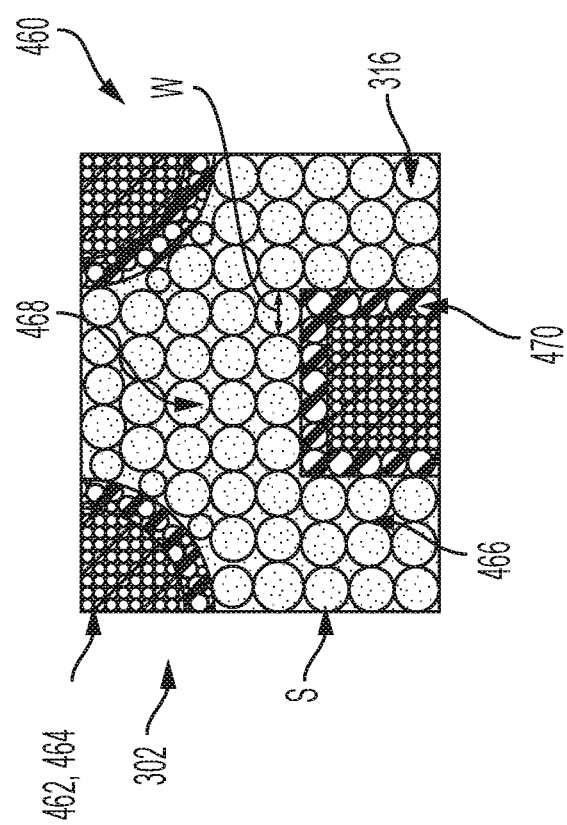
FIG. 4C illustrates an acoustic panel including varying densities of Helmholtz resonators tailored to suppress noise from one or more sources of acoustic waves, manufactured according to the method of FIG. 2.

FIG. 4A illustrates the core 308 comprising a plurality of noise attenuating features 316 comprising cells 312 and at least one opening 314 (e.g., comprising a perforation 306) in combination or acoustic communication with the one of the cells. The cells each have cell walls 402 disposed laterally away from the openings 314 so that the openings do not overlap with (and are not above or below) the cell walls. Moreover, the openings do not puncture the cell walls. In the example shown, all of the openings communicate with the interior of the cells for proper functioning of each of the noise attenuating features (e.g., Helmholtz resonators). In various examples, at least 90%, at least 95%, at least 99%, or 100% of the openings do not overlap with the cell walls.

For comparison, FIG. 4B illustrates an acoustic paneling 404 manufactured using the method of FIG. 1 and including a honeycomb core 406 comprising high density regions of cells 408 (e.g. Helmholtz resonators) spliced together with low density regions of the cells. The cells 408 have cell walls 410 that have been punctured or that overlap with the perforations 412 in the first face sheet attached to the core 406. A significant plurality of the perforations 412 do not coincide or communicate with the interiors of the cells 408 for proper functioning of the cells in a Helmholtz resonator configuration.

FIG. 4C illustrates an example area 460 of the acoustic panel 302 manufactured according to the method of FIG. 2 and including one or more first regions 462 having a first density 464 of the noise attenuating features 316, wherein the first density varies as a function of the position in the first region. The acoustic panel further comprises a second region 466 having a second density 468 of the noise attenuating features wherein the second density is lower than the first density and the second density varies as a function of position within the second region. FIG. 4C further illustrates interfacial regions 470 between the first region 462 and the second region 466 wherein the density of noise attenuating features 316 varies gradually (rather than abruptly) between the first density and the second density. In various examples, the density of the noise attenuating features varies gradually, continuously, or with a spatial resolution of less than 10 inches within and/or between each of the one or more regions 462, 466, 470.

Thus, the example of FIG. 4C illustrates the density, shape, or size (e.g., diameter W) of the noise attenuating features varies dynamically across a field area of the acoustic panel 302, e.g., as a function of position from one or more sources of acoustic waves and/or to provide for noise attenuating features tailored to suppress different frequencies of acoustic waves. For comparison, FIG. 4D illustrates an acoustic paneling 480 manufactured according to the method described in FIG. 1 and including a honeycomb core 482 comprising a low density region 484 of cells (e.g. Helmholtz resonators) spliced to a higher density region 486 of cells.

The size or dimensions of the cells do not vary within the high density region or the lower density region. Moreover, an interface 490 between the higher density region 486 and the lower density region 484 in the example of FIG. 4D is abrupt and does not allow for a gradual variation in the density of cells as illustrated in FIG. 4C. Since density and dimensions of the cells in FIG. 4D are consistent over large areas (i.e., the density and size of the cells cannot be made to dynamically change across the field area of the panel as in FIG. 4C), the acoustic paneling 480 only attenuates small ranges of frequencies of the acoustic waves. Furthermore, the acoustic paneling 480 in FIG. 4D does not have an acoustic property that can be tailored or fine tuned to suppress the unique acoustic signatures as a function of position relative to the sources of the acoustic waves, as is possible using the example illustrated in FIG. 4C.

Example Noise Attenuation Features

Figure 6A:
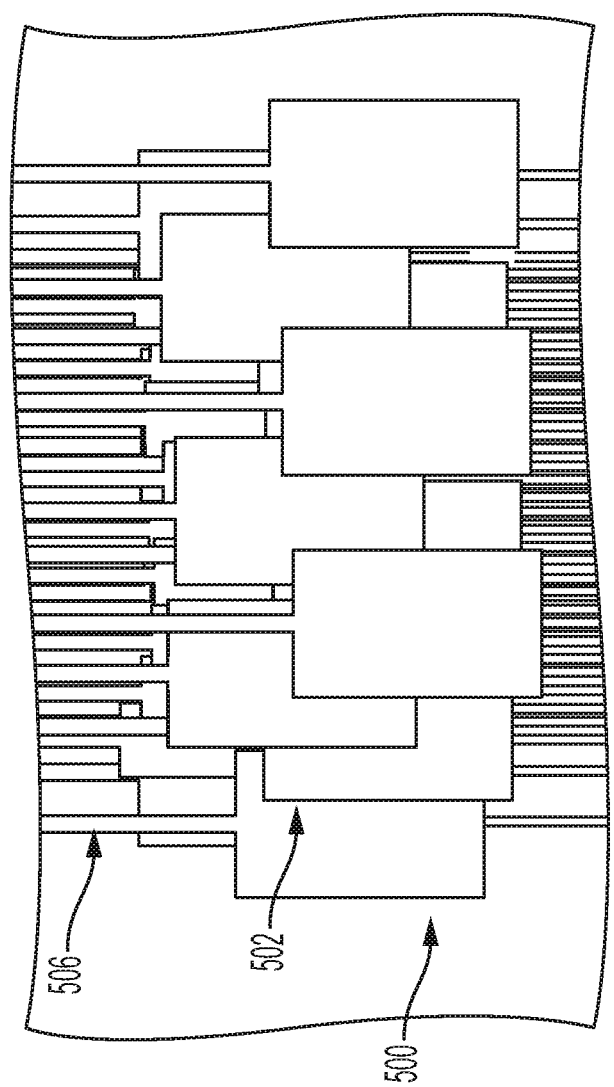
FIG. 6A is a perspective view of a plurality of Helmholtz resonators in an acoustic panel, according to one or more examples described herein.
Figure 5:
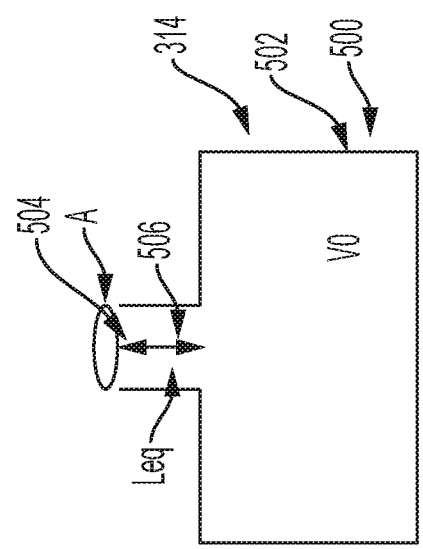
FIG. 5 is a schematic view of a Helmholtz resonator illustrating the parameters used to tune the acoustic property, according to one or more examples described herein.
Figure 6B:
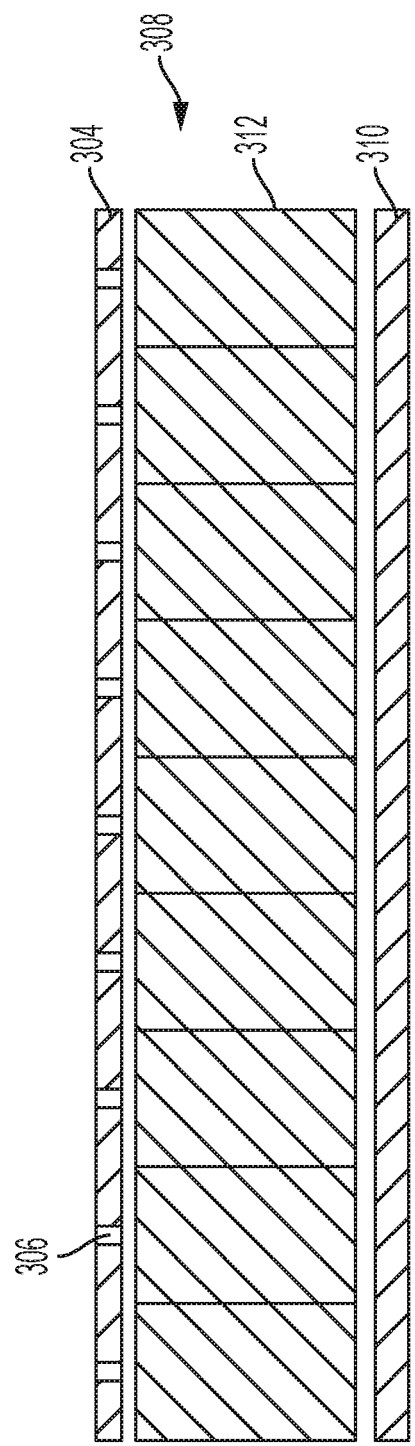
FIG. 6B is a cross-sectional view of hexagonal shaped Helmholtz resonators in an acoustic panel, according to one or more examples.

FIG. 5, FIG. 6A, and FIG. 6B illustrate example noise attenuating features 316 comprising Helmholtz resonator 500 (also known as a Helmholtz oscillator). The Helmholtz resonator includes the cell comprising a cavity 502 containing a gas (usually air) with an opening (an open hole 504 or a neck 506 with the open hole 504). A volume of air in the neck 506 and/or near/above the open hole 504 vibrates or oscillates in response to the acoustic waves propagating through the volume of air. The oscillation causes damping or suppression of the acoustic waves. Without being bound by a particular scientific theory, in one or more examples, the harmonic frequency $f_H$ of the oscillation (modeling the resonator as a harmonic oscillator) is given by $$f_H = \frac{v}{2\pi}\sqrt{\frac{A}{V_0 L_{eq}}}$$

where v is the speed of sound, A is the Area of the neck's cross-section, Vo is the volume of the cavity, and Leq is the length of the neck. Adjusting one or more of above parameters (A, Vo, Leq, or neck diameter or width) allows the harmonic frequency $f_H$ of resonator to be fine-tuned so as to suppress the transmission of the acoustic waves transmitted from specific noise sources (e.g., engines). In one or more examples, the harmonic frequency $f_H$ is tuned to suppress one or more frequencies of the acoustic waves.

Example cross-sectional shapes for the cells include, but are not limited to, hexagonal, square, circular, triangular cross-sectional shapes. Example dimensions for the cells include, but are not limited to, cells having a width or largest diameter in a range of ⅛"-1" and cell walls having a thickness of 1-5 millimeters. Example shapes for the cavity 502 include, but are not limited to, cubic, cuboidal, cylindrical, spherical or prismoidal shapes (e.g., a rectangular prism or hexagonal prism as illustrated in FIG. 3B and FIG. 6B).

Example: Engine Installation

Figure 7:
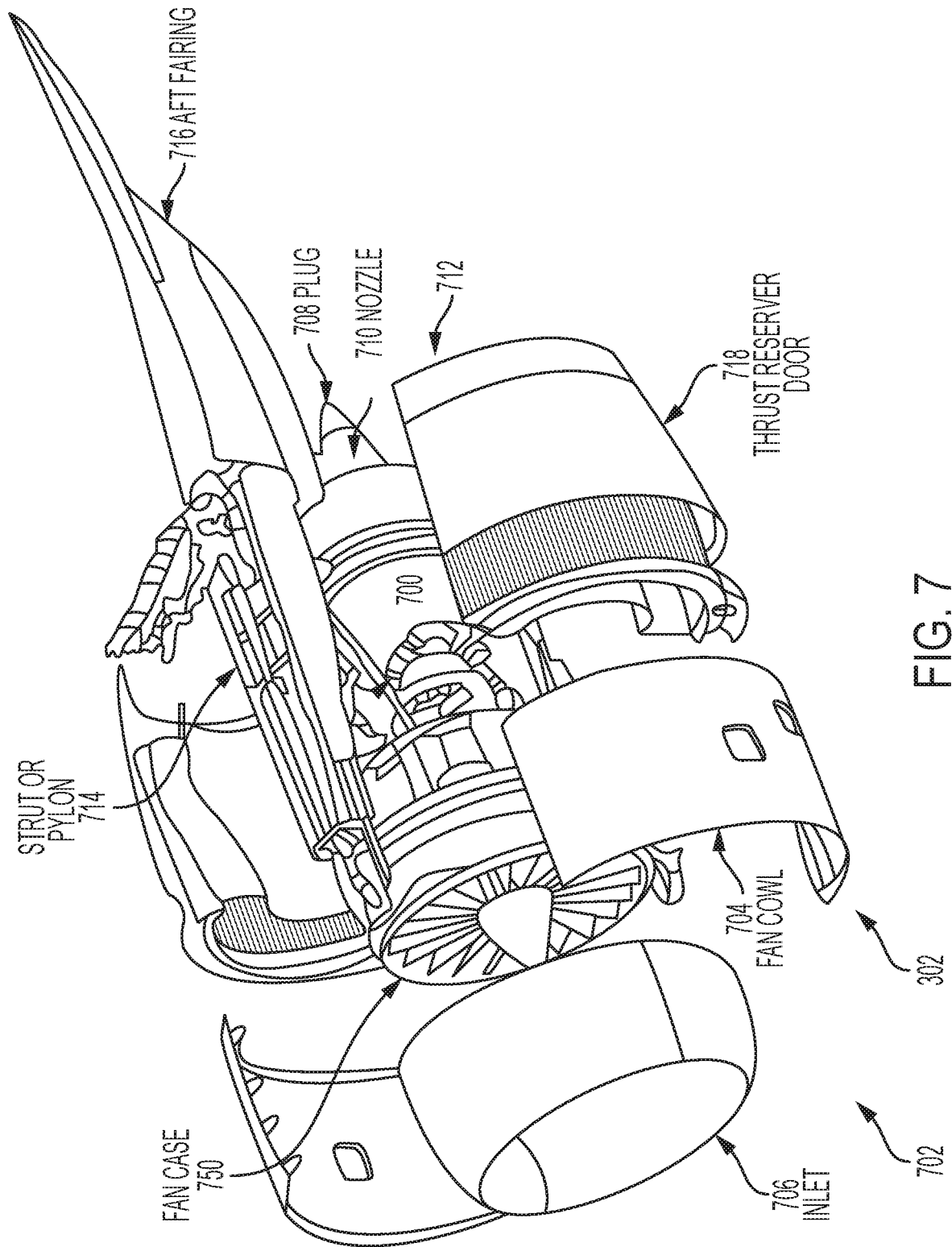
FIG. 7 illustrates an engine coupled to acoustic panels fabricated according to method of FIG. 2.

FIG. 7 illustrates an aircraft engine 700 disposed or housed in a nacelle 702, wherein the nacelle includes a fan cowl 704 and an inlet 706. The fan cowl 704 comprises an acoustic panel 302 configured to suppress noise from the aircraft engine 700.

Figure 8:
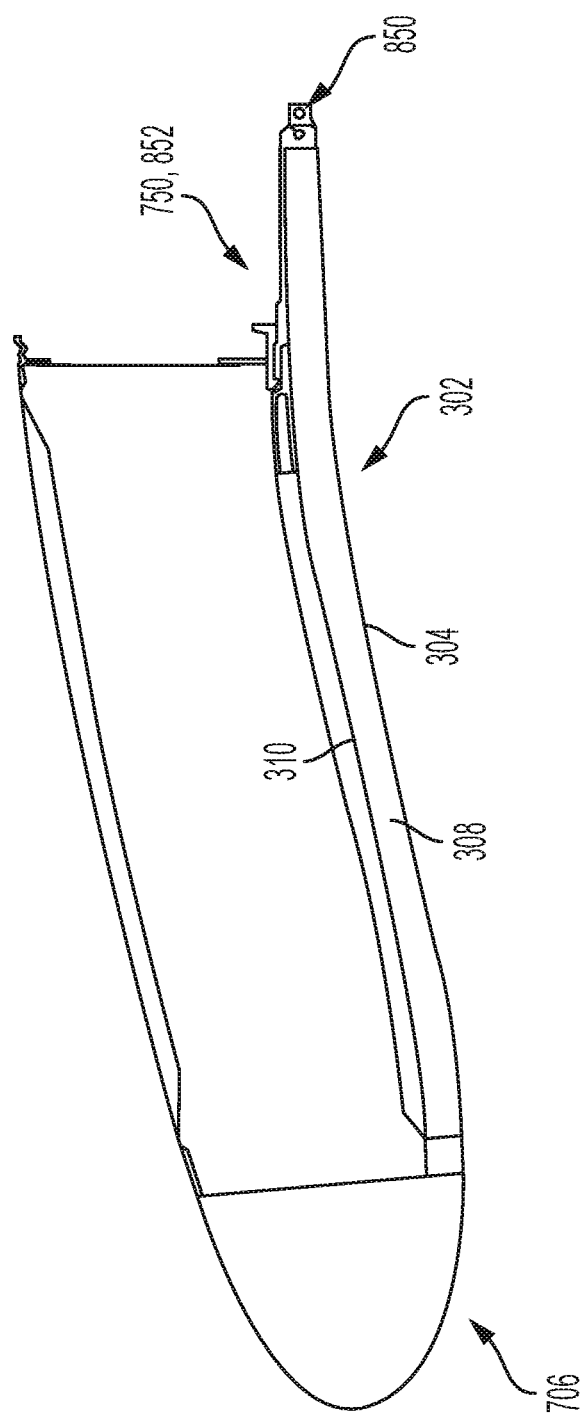
FIG. 8 is a cross-sectional view of a nacelle including an acoustic panel fabricated according to the method of FIG. 2.

FIG. 7 illustrates an example wherein the fan cowl includes the acoustic panel 302. However, in other non-limiting examples, the acoustic panel 302 comprises or is combined with any part of the aircraft engine assembly comprising the nacelle 702, fan case 750, the exhaust system (comprising plug 708, nozzle 710, thrust reverser assembly 712) or support structure (comprising strut or pylon 714 and aft fairing 716). FIG. 8 illustrates the inlet 706 portion of the nacelle 702 including the acoustic panel 302, wherein the acoustic panel includes a first face sheet 304, a second face sheet 310, and a core 308 (e.g., honeycomb core) sandwiched between first face sheet 304 and the second face sheet 310. FIG. 9 illustrates a thrust reverser assembly 712 comprising a blocker door 718, wherein the blocker door 718 includes a plurality of wedges 900 each comprising an acoustic panel 302 or acoustic treatment 902.

Figure 10A:
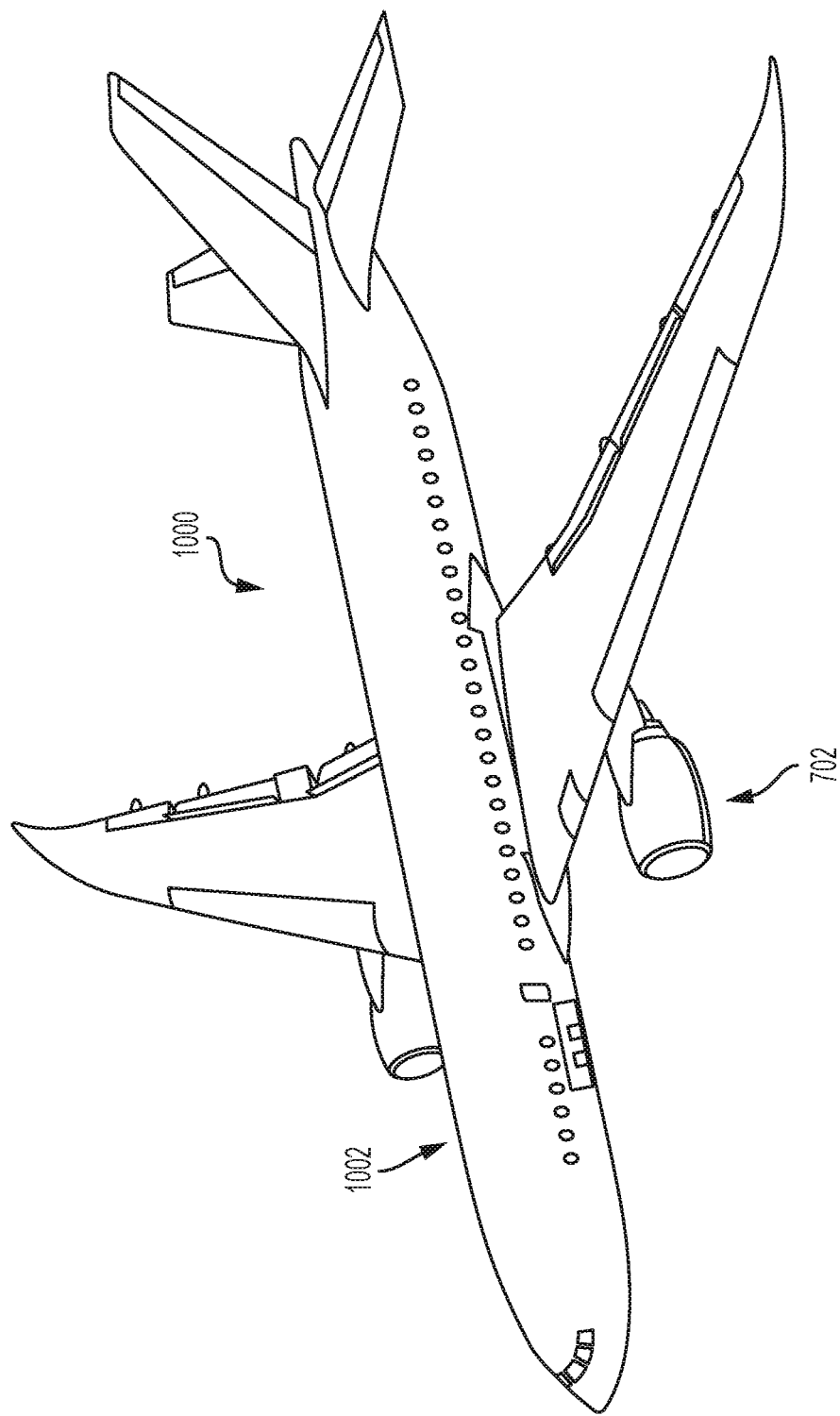
FIG. 10A illustrates an aircraft including an acoustic panel according to one or more examples described herein.
Figure 10C:
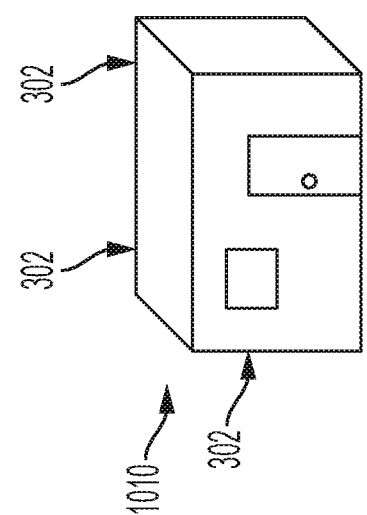
FIG. 10C illustrates a building including an acoustic panel according to one or more examples described herein.
Figure 10B:
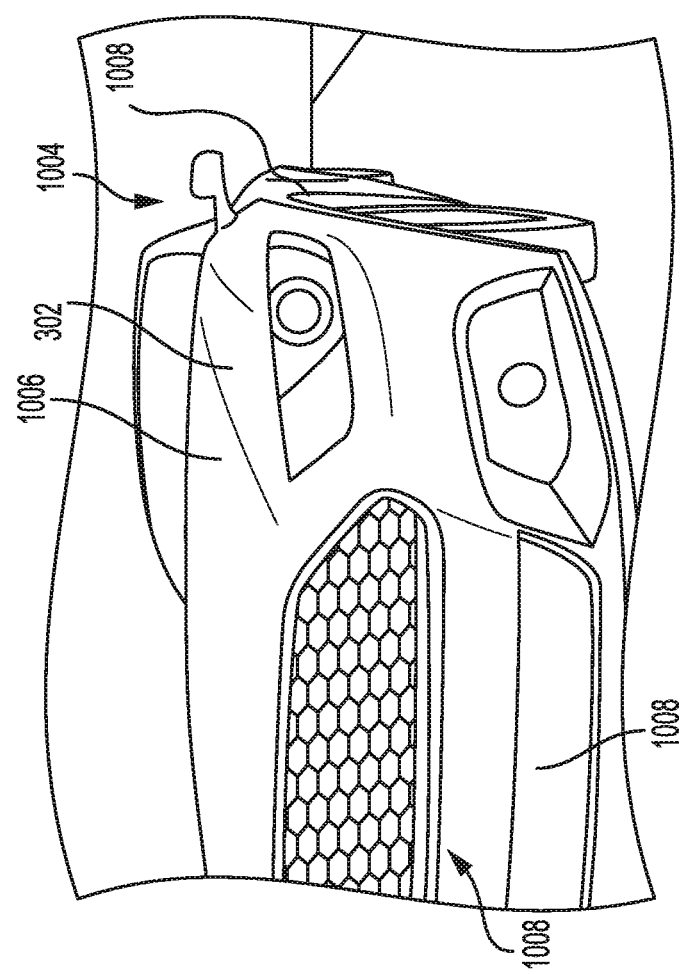
FIG. 10B illustrates a car including an acoustic panel according to one or more examples described herein.

FIG. 10A illustrates an aircraft 1000 comprising a component 1002 (e.g. fuselage) including an acoustic panel 302 or acoustic treatment according one or more examples described herein. FIG. 10B illustrates a car 1004 including the noise source in the engine compartment or external to the car and the acoustic panel 302 or acoustic treatment in the hood 1006 or other paneling 1008, part, or body part on the car 1004. Other examples include, but are not limited to, the acoustic panel 302 or acoustic treatment installed in a building 1010 to suppress noise outside or inside the building (as illustrated in FIG. 10C). In one or more examples, the core comprising additively manufactured, 3D printed, or molded material is combined with or embedded into a wall or construction material for the building. In yet further examples, the acoustic panel or acoustic treatment is installed in paneling, part, or body part of the train or boat to suppress noise inside or outside the train or boat.

Further Examples

Illustrative, non-exclusive examples of inventive subject matter according to the present disclosure are described in the following enumerated paragraphs:

A1. A structure comprising an acoustic panel (302) or acoustic treatment, comprising:

a first face sheet (304) having a plurality of openings (314);

a core (308) attached to the first face sheet, the core (308,) comprising a plurality of cells (312) each having cell walls (402); and a plurality of noise attenuating features (316) each comprising at least (95, 99) one of the openings (314) acoustically coupled to one of the cells (312), wherein the openings (314) are disposed away from the cell walls (402) so that the noise attenuating features (316) suppress a transmission of acoustic waves in acoustic communication with the openings (314).

A2. The acoustic panel of paragraph A1, wherein at least 95%, at least 99%, or 100% of the openings (314) are disposed away from the cell walls (402) and do not overlap with or puncture the cell walls (402).

A3. The acoustic panel of any of the paragraphs A1-A2, wherein the noise attenuating features (316) comprise Helmholtz resonators (500).

A4. The acoustic panel of any of the paragraphs A1-A3, wherein the core (308) comprises a first region (462) having a higher density of the cells (312) and a second region (466) having a lower density of the cells (312), without a joint between the first region (462) and the second region (466).

A5. The acoustic panel of paragraph A4, wherein the core (308) comprises a single monolithic piece including the higher density in more accurate correspondence with major load paths as compared to a core (406) assembled from higher density regions (486) of the cells (408) spliced together with lower density regions (484) of the cells (408).

A6. The acoustic panel of any of the paragraphs A4-A5, further comprising an interfacial region (470) between the first region (462) and the second region (466), wherein the higher density varies in the first region (462), the lower density varies in the second region (466), and a density of the cells (312) in the interfacial region (470) varies from the lower density adjacent the first region (462) to the higher density adjacent the second region (466).

A7. The acoustic panel of any of the paragraphs A1-A6, further comprising a second face sheet (310) or backing structure attached to the core (308) so that the core (308) is sandwiched between the first face sheet (304) and the second face sheet (310) or the backing structure.

A8. The acoustic panel of paragraph A7, wherein the core (308) is additively manufactured or molded with a back contour (350) that is tailored to contour and fit the second face sheet (310) or the backing structure.

A9. The acoustic panel of any of the paragraphs A1-A8, wherein the core (308) is additively manufactured, 3D printed, or molded.

A10. The acoustic panel of paragraph A9, wherein the core includes a fastener (850) for attaching the acoustic panel (302) in an assembly (852) and the core has a lower mass than an identical core that is not additively manufactured or molded.

A11. The acoustic panel of paragraph A10, wherein the core (302) comprises a thermoplastic.

A12. The acoustic panel of any of the paragraphs A1-A11, wherein the cell walls (402) consist essentially of molded thermoplastic.

A13. An apparatus, comprising:
a nacelle (702) including the acoustic panel (302) of any of the paragraphs A1-A12; and
an aircraft engine (700) housed or disposed in the nacelle (702), wherein the acoustic panel (302) suppresses the transmission of the acoustic waves generated in the aircraft engine (702).

A14. An apparatus, comprising a thrust reverser assembly (712) comprising the acoustic panel (302) of any of the paragraphs A1-A13.

A15. An aircraft component (1002) comprising the acoustic panel (302) of any of the paragraphs A1-A14.

B1. A method of making an acoustic panel, comprising:
attaching a first face sheet to a core including a plurality of cells having cell walls; and
perforating or forming the face sheet with a plurality of openings (e.g., comprising perforations) after attaching the face sheet to the core, so as to form a plurality of noise attenuating features (e.g., Helmholtz resonators) each comprising at least one of the openings in combination with (acoustically coupled to) one of the cells, wherein the openings are disposed away from the cell walls so that the noise attenuating features suppress the transmission of acoustic waves in acoustic communication with the openings.

B2. The method of paragraph B1, further comprising attaching a second face sheet or backing structure to the core so that the core is sandwiched between the first face sheet and the second face sheet or the backing structure.

B3. The method of paragraph B1 or B2, further comprising curing the core, the first face sheet, and the second face sheet prior to perforating the first face sheet.

B4. The method of paragraphs B1 or B2, further comprising fabricating the acoustic panel with a single cure step prior to perforating the first face sheet.

B5. The method of any of the paragraphs B1-B3, further comprising additively manufacturing the core.

B6. The method of any of the paragraphs B1-B4, further comprising additively manufacturing the core using a material comprising a thermoplastic or molding the material to form the core.

B7. The method of any of the paragraphs B1-B6, further comprising:
obtaining or generating data including a plurality of first locations of the cell walls;
using the data to generate a data file including a plurality of second locations of the openings, so that the second locations do not spatially overlap with the first locations; and
perforating or otherwise forming the openings using a machine controlled by a computer, wherein the computer instructs the machine to form the openings at the plurality of second locations obtained from the data file.

B8. The method of paragraph B7, wherein the computer controls the positioning such that machine forms 100% of the openings away from the cell walls.

B9. The method of any of the paragraphs B1-B8, further comprising disposing the acoustic panel in an aircraft engine component.

B10. The method of any of the paragraphs B1-B9 used to fabricate the acoustic panel of any of the paragraphs A1-A15.

B11. The method of any of the paragraphs B1-B10, wherein the structure comprises composite materials or thermoplastic and the structure is at least as strong as the structure comprising the same materials and design but manufactured using the method of FIG. 1 and multiple autoclave cycles (multiple autoclave cycles are conventionally needed to create a strong, acoustically treated structure).

B12. The method of any of the paragraphs B1-B10, wherein the structure is manufactured using a single curing step to form the structure in less time and with lower cost as compared to the structure manufactured using the method of FIG. 1.

B12. The method of any of the paragraphs B1-B11, wherein the core is manufactured using molded thermoplastic or additive manufacturing to form the core in less time and with lower cost as compared to the structure manufactured by splicing together low and high density core pieces.

Processing Environment

Figure 11:
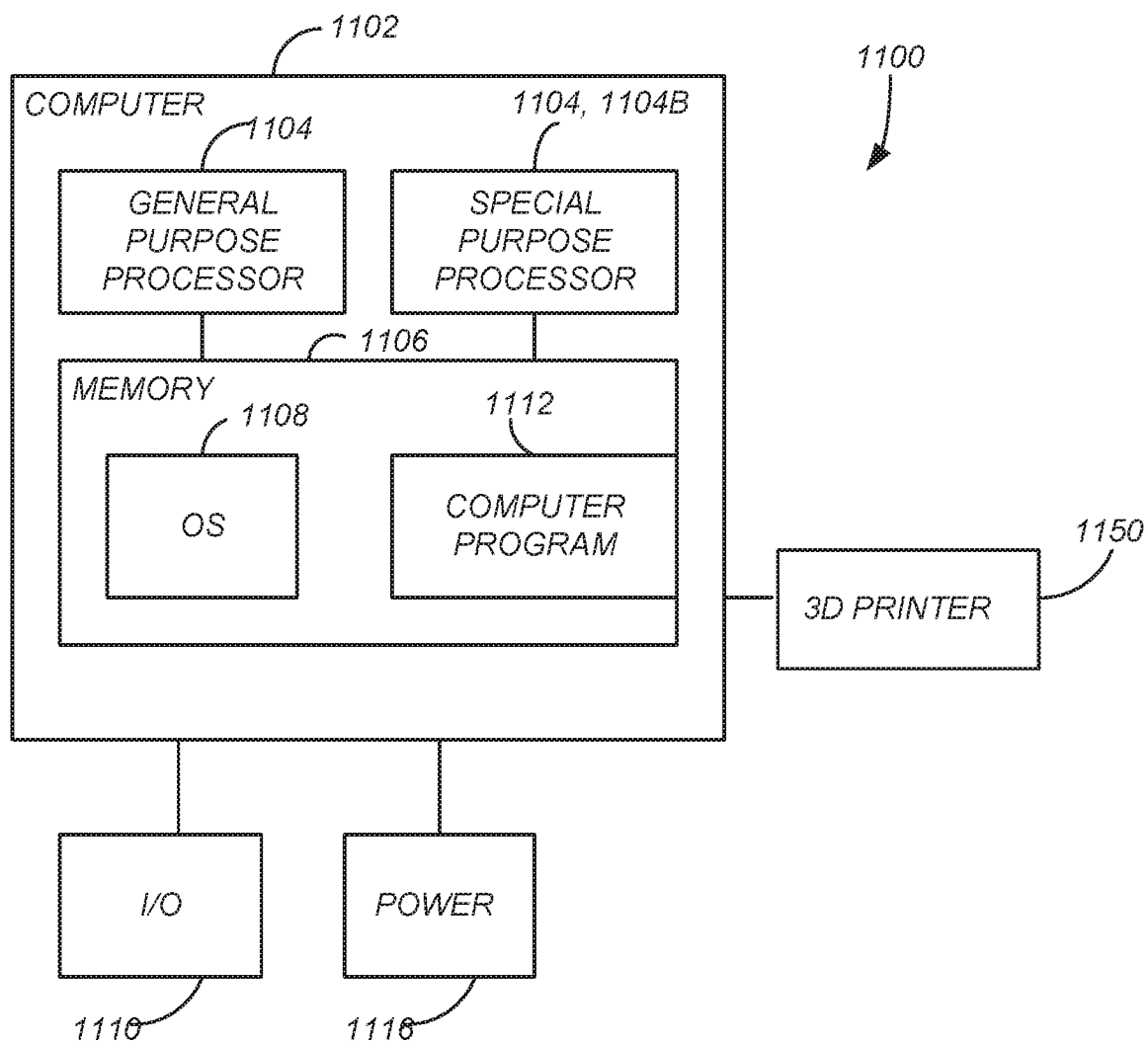
FIG. 11 illustrates an example hardware and software environment useful for designing and manufacturing an acoustic panel according to one or more examples described herein.

FIG. 11 illustrates an exemplary system 1100 used to implement processing elements needed to control the machine 1150 (e.g., 3D printer) used to manufacture the acoustic panel.

The computer 1102 comprises a processor 1104 (general purpose processor 1104A and special purpose processor 1104B) and a memory, such as random access memory (RAM) 1106. Generally, the computer 1102 operates under control of an operating system 1108 stored in the memory 1106, and interfaces with the user/other computers to accept inputs and commands (e.g., analog or digital signals) and to present results through an input/output (I/O) module 1110. The computer program application 1112 accesses and manipulates data stored in the memory 1106 of the computer 1102. The operating system 1108 and the computer program 1112 are comprised of instructions which, when read and executed by the computer 1102, cause the computer 1102 to perform the operations herein described. In one embodiment, instructions implementing the operating system 1108 and the computer program 1112 are tangibly embodied in the memory 1106, thereby making one or more computer program products or articles of manufacture capable of controlling the 3D printer, additive manufacturing machine 1150, or molding machine so as to fabricate parts according to the methods described herein. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An acoustic panel, comprising:
   a first face sheet having a plurality of openings;
   a core attached to the first face sheet, the core comprising a plurality of cells each having cell walls; and
   a plurality of noise attenuating features each comprising at least one of the openings acoustically coupled to one of the cells, wherein the openings are disposed away from the cell walls so that the noise attenuating features suppress a transmission of acoustic waves in acoustic communication with the openings;
   wherein the core comprises a first region having a higher density of the cells and a second region having a lower density of the cells, without a joint between the first region and the second region.

2. The acoustic panel of claim 1, wherein 100% of the openings are disposed away from the cell walls and do not overlap with or puncture the cell walls.

3. The acoustic panel of claim 1, wherein the noise attenuating features comprise Helmholtz resonators.

4. The acoustic panel of claim 1, wherein the core comprises a single monolithic piece including the higher density in more accurate correspondence with major load paths as compared to a core assembled from higher density regions of the cells spliced together with lower density regions of the cells.

5. The acoustic panel of claim 1, further comprising an interfacial region between the first region and the second region, wherein the higher density varies in the first region, the lower density varies in the second region, and a density of the cells in the interfacial region varies from the lower density adjacent the first region to the higher density adjacent the second region.

6. The acoustic panel of claim 1, further comprising a second face sheet or backing structure attached to the core so that the core is sandwiched between the first face sheet and the second face sheet or the backing structure.

7. The acoustic panel of claim 6, wherein the core is additively manufactured or molded with a back contour that is tailored to contour and fit the second face sheet or the backing structure.

8. The acoustic panel of claim 1, wherein the core is additively manufactured.

9. The acoustic panel of claim 8, wherein the core includes a fastener for attaching the acoustic panel in an assembly and the core has a lower mass than an identical core that is not additively manufactured.

10. The acoustic panel of claim 1, wherein the core comprises a thermoplastic.

11. The acoustic panel of claim 1, wherein the cell walls consist essentially of molded thermoplastic.

12. An apparatus, comprising:
    a nacelle including the acoustic panel of claim 1; and
    an aircraft engine disposed in the nacelle, wherein the acoustic panel suppresses the transmission of the acoustic waves generated in the aircraft engine.

13. An apparatus, comprising a thrust reverser assembly comprising the acoustic panel of claim 1.

14. An aircraft component comprising the acoustic panel of claim 1.

15. A method of making an acoustic panel, comprising:
    attaching a first face sheet to a core including a plurality of cells having cell walls; and
    perforating the first face sheet with a plurality of perforations after attaching the first face sheet to the core, so as to form a plurality of noise attenuating features each comprising at least one of the perforations acoustically coupled to one of the cells, wherein the perforations are disposed away from the cell walls so that the noise attenuating features suppress a transmission of acoustic waves in acoustic communication with the perforations;
    wherein the core comprises a first region having a higher density of the cells and a second region having a lower density of the cells, without a joint between the first region and the second region.

16. The method of claim 15, further comprising attaching a second face sheet or backing structure to the core so that the core is sandwiched between the first face sheet and the second face sheet or the backing structure.

17. The method of claim 16, further comprising curing the core, the first face sheet, and the second face sheet prior to perforating the first face sheet.

18. The method of claim 15, further comprising fabricating the acoustic panel with a single cure step prior to perforating the first face sheet.

19. The method of claim 15, further comprising additively manufacturing the core.

20. The method of claim 15, wherein the acoustic panel further comprises an interfacial region between the first region and the second region, wherein the higher density varies in the first region, the lower density varies in the second region, and a density of the cells in the interfacial region varies from the lower density adjacent the first region to the higher density adjacent the second region.

* * * * *